United States Patent Office 2,877,408
Patented Mar. 10, 1959

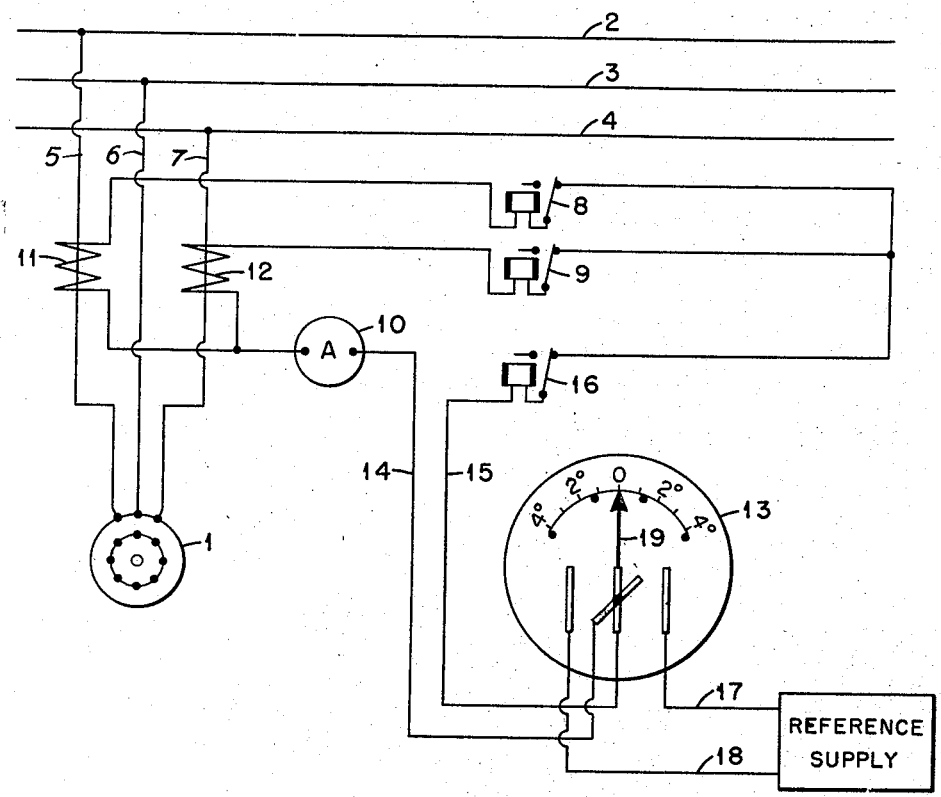
INVENTOR.
BY Aaron W. Williams
ATTORNEY

2,877,408

INSPECTION MEANS FOR INDUCTION MOTORS

Aaron W. Williams, Paducah, Ky., assignor to the United States of America as represented by the United States Atomic Energy Commission Application September 6, 1956, Serial No. 608,412

3 Claims. (Cl. 324—51)

The present invention relates to methods for inspecting electric motors, and more especially to a method for detecting faulty end rings in squirrel-cage induction motors.

In the well-known squirrel-cage induction motor, the rotor bars are short-circuited by means of end rings joined to opposite ends of each bar. These rings are subject to failure during operation, particularly in the case of large, heavy duty motors delivering around 2000 H. P. Faults in the end rings cause no measurable change in speed or current of a fully loaded motor, so that there has been heretofore no means for detecting faults or breaks in the end rings except by shutting down the motors and visually inspecting them. Such visual inspection is laborious, but of more importance it requires that the process served by the motors be shut down completely during motor inspection. In a continuous process such as the separation of uranium isotopes by gaseous diffusion, any shut down results in a significant loss of product output, and therefore should be avoided.

Accordingly, it is the primary object of the invention to provide a method for detecting faulty end rings while the motors are in normal operation. It is a further object of the invention to provide means for detecting faults and breaks in the end rings rapidly, safely, and inexpensively. Other objects of the invention will be apparent from the following detailed description thereof when read in conjunction with the appended drawing which illustrates schematically a manner of practicing my invention.

In accordance with my invention, I measure the phase angle between a first current derived from a reference source of alternating current and the current flowing in the stator winding of a squirrel-cage motor while the motor is rotating at substantially constant speed, and measure and indicate the magnitude of repetitive changes in the phase angle to detect end ring faults. For a correctly operating motor, the phase angle will remain substantially constant. If, however, there is a break or a fault in the end rings such as a faulty weld, for example, I have found that a repetitive pulsation will occur in the phase angle. The number of these pulsations will equal the product of the number of motor poles and the slip of the motor. I have further found that the amplitude of the pulsations is indicative of the fault causing them. For example, faulty welds will cause pulsations of from about 1 to about 2½ degrees amplitude, while broken end rings result in pulsations of at least 4°. These conditions may be detected even when the motor load is changing.

My novel method may be practiced by connecting a conventional phase angle meter to a source of reference current and in series with the stator winding, and indicating the phase difference on a meter calibrated in degrees of phase angle. If additional indication is desired, the meter pointer may be caused to make contact with first or second spaced electrical contacts, depending upon its deflection, closing auxiliary circuits to provide different aural or visual signals responsive to phase angle swings greater than 1° and greater than about 4°, respectively.

As is well known in the art, the rotor element of a squirrel-cage motor comprises a cylindrical core in which are machined skewed slots to receive rotor bars or windings. These bars are all short circuited at opposite ends by a pair of end rings which make good electrical contact with the respective ends of each rotor bar. The bars may be welded to the end rings, or silver-soldered thereto, or the ends of the bars may be reduced to fit in a series of apertures spaced around the periphery of the rings and to make electrical contact therewith. The end rings themselves may be stamped from metal, or for large machines may be bronze angle iron bent and welded into a ring. The rotor is mounted on a shaft to rotate inside the stator windings responsive to the rotating field established by the stator currents. Referring now to the attached drawing, the motor 1 comprising the rotor and stator may be supplied with three-phase alternating current from busses 2, 3, 4 in the conventional manner. Connections to the stator windings may be along leads 5, 6, 7. Over-current relays 8, 9 may be connected in circuit with the stator winding for protective purposes, so that the current may be measured with ammeter 10. The current may be supplied by step-down transformers 11, 12, connected in the conventional manner to the stator. A conventional phase angle meter 13 has two leads 14, 15 which are connected in series with the ammeter 10, which receives current from the stator via transformers 11, 12. A suitable connection is made between the terminals of ammeter 10 and alarm relay 16. The opposite or reference terminals 17, 18 of the phase angle meter are connected to source of a reference current such as the 110 volt A. C. line.

In operation of my novel method, the motor is energized and brought up to speed. Next, the phase angle is measured by connecting the phase angle meter to receive both the reference current and the stator current as stepped down. The pointer 19 will display the angle on meter 13, and will oscillate or swing repetitively each time the fault passes under a motor pole. The amplitude of the swing or pulsation of the phase angle meter as measured and indicated on the meter indicates the type of fault of the end rings tested.

Phase angle meters of any conventional type may be utilized—three phase or single phase meters equally as well. For example the Westinghouse phase angle meter described on p. 1 of Catalog 43–115 is a satisfactory 3 phase meter. Other types of phase-angle meters are described in standard texts.

For other than visual measurement of the amplitude of phase angle pulsation, the meter face may be transparent, with a light source and a photocell aligned on opposite sides of the meter such that the needle will block the light beam when it is deflected past the one degree or four degree points, as desired, actuating a suitable alarm connected to the photocell. Alternatively, contact-making meters may be provided to close external light or buzzer circuits upon deflections of either one or four degrees, as desired for detection of faulty or broken rings. Other means for measuring and indicating phase angle variations, such as a phase comparison circuit and electrical recorder, will be apparent to those skilled in the art.

It will be apparent, therefore, that I have provided a new and unique method for testing squirrel-cage induction motors during actual process operation. The method is safe, inexpensive, and involves no complicated equipment, so that it may be practiced by relatively unskilled operators.

Having described my invention, what is claimed as novel is:

1. Means for testing a squirrel-cage rotor of a normally rotating induction motor for broken or high-resistance bars or end rings, said testing means comprising a current transformer wound around at least one stator lead of said motor, said transformer supplying a first current, a source of reference current, for supplying a second current, means connected to said first and second currents for measuring and displaying the phase angle therebetween, said displaying means being provided with a pointer and indicia to indicate the amplitude of pulsations in said phase angle as an indication of the condition of said end rings.

2. Means for testing a rotor as set forth in claim 1 in which said means comprises a phase angle meter, and said indicia are calibrated in degrees of phase angle to display pulsations of one degree as indicative of a faulty high resistance end ring and pulsations of four degrees as indicative of a broken end ring.

3. An improved testing system for faulty end rings in a normally rotating squirrel-cage motor, said system comprising a first current supply means inductively coupled to at least one stator lead of said motor, a second current supply means connected to a reference voltage source, a phase angle meter, means for connecting said first current supply means and said second current supply means to said phase angle meter, said meter being provided with a pointer and indicia calibrated to indicate the magnitude of both the normal phase angle between the respective current supply means and pulsations in the normal phase angle which are indicative of a faulty end ring.

References Cited in the file of this patent
UNITED STATES PATENTS 2,640,100   Packer ---------------- May 26, 1953